US009133930B2

(12) United States Patent
Takahashi et al.

(10) Patent No.: US 9,133,930 B2
(45) Date of Patent: Sep. 15, 2015

(54) CONTINUOUSLY VARIABLE TRANSMISSION AND ITS HYDRAULIC PRESSURE CONTROL METHOD

(71) Applicants: JATCO LTD, Fuji-shi, Shizuoka (JP); NISSAN MOTOR CO., LTD., Yokohama-shi, Kanagawa (JP)

(72) Inventors: Seiichiro Takahashi, Isehara (JP); Takashi Eguchi, Machida (JP); Tomohiro Utagawa, Sagamihara (JP); Yuta Ishinabe, Utsunomiya (JP); Tetsuya Izumi, Ayase (JP); Takahiro Kobayashi, Higashikurume (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/387,414

(22) PCT Filed: Feb. 21, 2013

(86) PCT No.: PCT/JP2013/054414
§ 371 (c)(1),
(2) Date: Sep. 23, 2014

(87) PCT Pub. No.: WO2013/145974
PCT Pub. Date: Oct. 3, 2013

(65) Prior Publication Data
US 2015/0081181 A1    Mar. 19, 2015

(30) Foreign Application Priority Data
Mar. 28, 2012 (JP) .................................. 2012-074925

(51) Int. Cl.
*F16H 61/662* (2006.01)
*F16H 61/66* (2006.01)

(52) U.S. Cl.
CPC ...... *F16H 61/66236* (2013.01); *F16H 61/6624* (2013.01); *F16H 61/66259* (2013.01); *F16H 61/66272* (2013.01); *F16H 61/66* (2013.01); *F16H 61/662* (2013.01); *F16H 2061/6629* (2013.01); *F16H 2061/66277* (2013.01)

(58) Field of Classification Search
CPC .................. F16H 61/66; F16H 61/662; F16H 2061/66277; F16H 2061/6629
See application file for complete search history.

(56) References Cited

U.S. PATENT DOCUMENTS

2005/0192153 A1* 9/2005 Jozaki et al. ..................... 477/45
2015/0051032 A1* 2/2015 Takahashi et al. .............. 474/11

FOREIGN PATENT DOCUMENTS

| JP | 63-074736 A | | 4/1988 |
|---|---|---|---|
| JP | 2007224992 A | * | 9/2007 |
| JP | 2008-051317 A | | 3/2008 |
| JP | 2008-128370 A | | 6/2008 |
| WO | WO 2012/017536 A1 | | 2/2012 |

* cited by examiner

*Primary Examiner* — Tisha Lewis
(74) *Attorney, Agent, or Firm* — Foley & Lardner LLP

(57) ABSTRACT

A transmission controller determines whether a shift returning to low, changing a speed ratio of a continuously variable transmission to the lowest when a vehicle decelerates, is being performed or not, calculates a primary pressure measured lower limit value at which a belt begins to slip actually, based on a deceleration of the vehicle and the speed ratio of the continuously variable transmission, and sets a lower limit value of a target value of the primary pressure during the shift returning to low as the primary pressure measured lower limit value.

9 Claims, 6 Drawing Sheets

CONTINUOUSLY VARIABLE TRANSMISSION AND ITS HYDRAULIC PRESSURE CONTROL METHOD

TECHNICAL FIELD

The present invention relates to hydraulic pressure control of a continuously variable transmission.

BACKGROUND ART

In a continuously variable transmission (hereinafter referred to as a "CVT") that winds a belt between a primary pulley and a secondary pulley, and that changes a speed ratio continuously by changing widths of grooves of the pulleys, a shift returning to low that changes the speed ratio to the lowest is performed when a vehicle decelerates, and thus restartability of the vehicle is secured (JP63-74736A).

SUMMARY OF INVENTION

One of the methods for improving fuel efficiency of the vehicle on which the CVT is mounted is to downsize an oil pump as a hydraulic source of a transmission. When the oil pump is downsized, engine power consumed for driving the oil pump is reduced and, as a discharge pressure of the oil pump reduces, friction inside the oil pump and the transmission becomes smaller, as a result of which the fuel efficiency of the vehicle can be improved.

However, it is found out that, as the downsizing of the oil pump progresses, such a problem is caused in the shift returning to low that a shift speed slows down and the speed ratio cannot be changed to the lowest, or can be changed to the lowest but requires a longer period of time (failure in returning to low).

The reason for this problem will be explained with reference to FIG. 6. FIG. 6 illustrates the state where a brake pedal is depressed at a time ta, a vehicle is decelerated, and a shift returning to low is performed.

In this example, based on the speed ratio of the CVT, a computation of a required secondary pressure, as a secondary pressure required for maintaining the speed ratio, is first performed. Then, based on a pressure receiving area ratio between the primary pulley and the secondary pulley, the required secondary pressure is converted into a primary balance pressure (X1 in the drawing), and a required differential thrust required for the shift is subtracted from the primary balance pressure, so as to perform a computation of a target primary pressure (X2 in the drawing).

When the target primary pressure becomes lower than a primary pressure lower limit value that is decided from a belt slip limit (at a time tb and thereafter), the target primary pressure is limited to the primary pressure lower limit value (X3 in the drawing). In order to make up for the differential thrust that runs short due to this limitation, the required secondary pressure is corrected and increased (X4 in the drawing).

It should be noted that, when an oil quantity balance is sufficient and an actual secondary pressure can be increased to a required secondary pressure after correction, the required differential thrust can be obtained, and the failure in returning to low is not caused.

However, when an oil pump discharging ability is poor and a shortfall in the oil quantity balance is caused, the actual secondary pressure does not increase to the required secondary pressure after correction (X5 in the drawing), and the required differential thrust cannot be obtained. Moreover, with regard to the primary pressure lower limit value, its minimum pressure is limited to a predetermined value based on a theoretical torque capacity expression (as will be described later), irrespective of traveling conditions. As a result of this, when the shortfall in the oil quantity balance is actually caused, the shift speed is lowered, and the vehicle stops before the speed ratio returns to the lowest (X6 in the drawing).

It is an object of the present invention to provide a continuously variable transmission that performs a shift returning to low, in which a property of returning to low is improved and fuel efficiency is further improved by downsizing an oil pump.

One aspect of the present invention provides a continuously variable transmission that includes a primary pulley, a secondary pulley, and a belt wound therebetween, and that decides a pulley thrusting force by a primary pressure supplied to the primary pulley and a secondary pressure supplied to the secondary pulley, in which the continuously variable transmission determines whether a shift returning to low, changing a speed ratio of the continuously variable transmission to lowest when a vehicle decelerates, is being performed or not, calculates a primary pressure measured lower limit value at which the belt begins to slip actually, based on a deceleration of the vehicle and the speed ratio of the continuously variable transmission, and sets a lower limit value of a target value of the primary pressure, during the shift returning to low, as the primary pressure measured lower limit value.

Another aspect of the present invention provides a hydraulic pressure control method of a continuously variable transmission that includes a primary pulley, a secondary pulley, and a belt wound therebetween, and that decides a pulley thrusting force by a primary pressure supplied to the primary pulley and a secondary pressure supplied to the secondary pulley, the hydraulic pressure control method including determining whether a shift returning to low, changing a speed ratio of the continuously variable transmission to lowest when a vehicle decelerates, is being performed or not, calculating a primary pressure measured lower limit value at which the belt begins to slip actually, based on a deceleration of the vehicle and the speed ratio of the continuously variable transmission, and setting a lower limit value of a target value of the primary pressure, during the shift returning to low, as the primary pressure measured lower limit value.

According to these aspects, the lower limit value of the primary pressure is reduced so that the secondary pressure during the shift returning to low can be relatively reduced (or the differential thrust required for the shift can be obtained even though the enough secondary pressure is not secured), which makes it possible to improve the property of returning to low and to further improve the fuel efficiency by downsizing the oil pump.

An embodiment and advantages of the present invention will be explained in detail with reference to the attached drawings.

DESCRIPTION OF EMBODIMENTS

Figure 1:
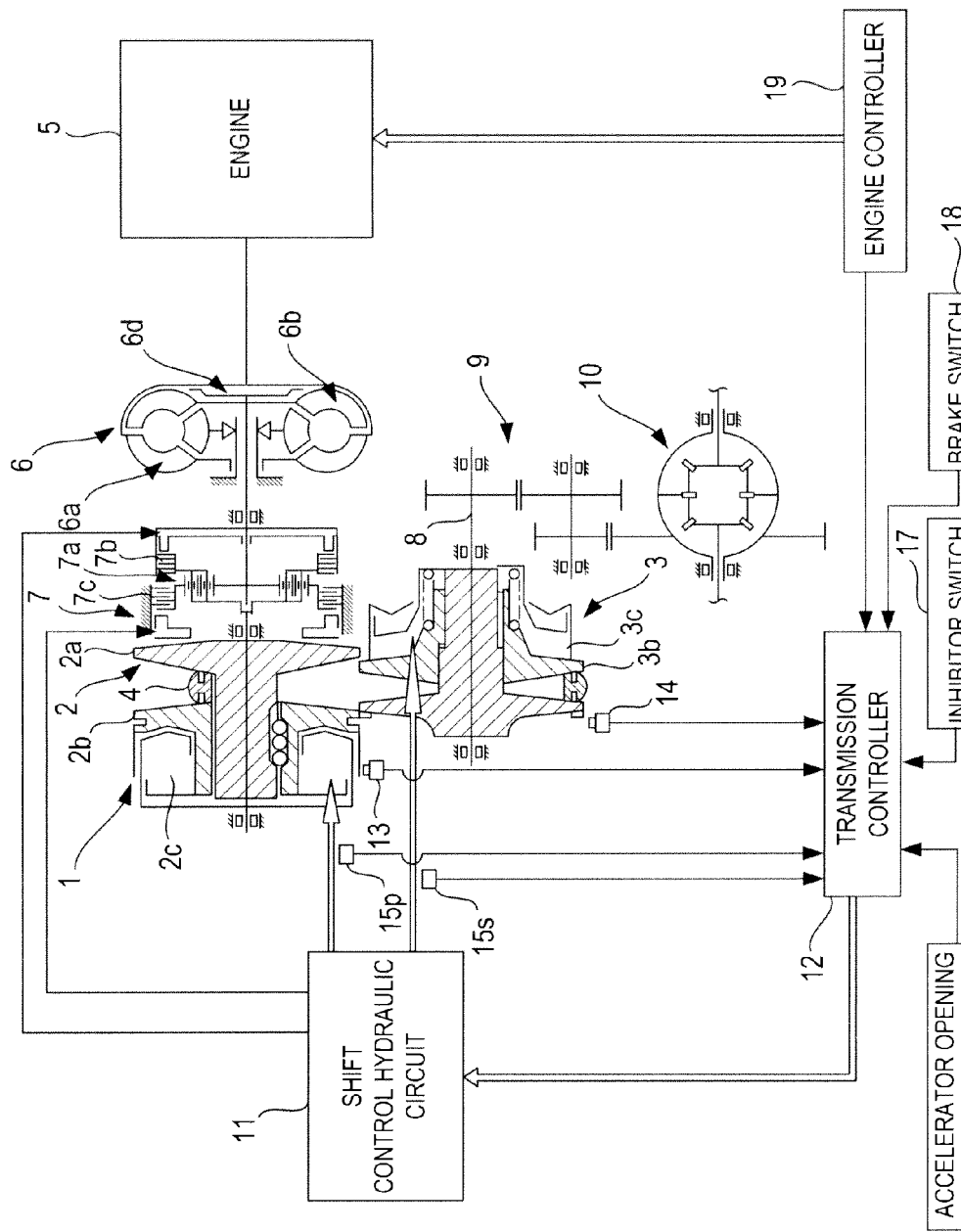
FIG. 1 is a schematic block diagram of a continuously variable transmission.

FIG. 1 illustrates a schematic configuration of a continuously variable transmission (hereinafter referred to as a "CVT") 1. A primary pulley 2 and a secondary pulley 3 are arranged so that grooves of the pulleys 2 and 3 are aligned, and a belt 4 is hung between the grooves of the pulleys 2 and 3. An engine 5 is arranged coaxially with the primary pulley 2 and, between the engine 5 and the primary pulley 2, a torque converter 6 and a forward/reverse movement switching mechanism 7 are provided in order from the engine 5 side.

The torque converter 6 is provided with a pump impeller 6a that is coupled to an output shaft of the engine 5, a turbine runner 6b that is coupled to an input shaft of the forward/reverse movement switching mechanism 7, a stator 6c, and a lock-up clutch 6d.

The forward/reverse movement switching mechanism 7 has a double pinion planetary gear train 7a as its main component, and its sun gear is connected to the turbine runner 6b of the torque converter 6 and its carrier is connected to the primary pulley 2. The forward/reverse movement switching mechanism 7 is further provided with a start clutch 7b that directly connects the sun gear and the carrier of the double pinion planetary gear train 7a, and a reverse brake 7c that fixes a ring gear. When the start clutch 7b is engaged, input rotation that is transmitted from the engine 5 via the torque converter 6 is transmitted to the primary pulley 2 without any change, and when the reverse brake 7c is engaged, the input rotation that is transmitted from the engine 5 via the torque converter 6 is reversed and transmitted to the primary pulley 2.

Rotation of the primary pulley 2 is transmitted to the secondary pulley 3 via the belt 4, and rotation of the secondary pulley 3 is transmitted via an output shaft 8, a gear train 9, and a differential gear device 10 to a not-illustrated drive wheel.

In order to allow a speed ratio between the primary pulley 2 and the secondary pulley 3 to be changeable during the above-described power transmission, conical plates on one side are made as fixed conical plates 2a and 3a, and conical plates 2b and 3b on the other side are made as movable conical plates that can be displaced in the axis direction, the conical plates forming the grooves of the primary pulley 2 and the secondary pulley 3.

As a primary pressure Ppri and a secondary pressure Psec, generated by using a line pressure as a source pressure, are supplied to a primary pulley chamber 2c and a secondary pulley chamber 3c, the movable conical plates 2b and 3b are biased toward the fixed conical plates 2a and 3a. Thereby, the belt 4 is frictionally engaged with the conical plates and the power is transmitted between the primary pulley 2 and the secondary pulley 3.

A shift is made by changing the widths of the grooves of the pulleys 2 and 3 by a differential pressure between the primary pressure Ppri and the secondary pressure Psec, and by continuously changing winding circular arc diameters of the belt 4 with respect to the pulleys 2 and 3.

The primary pressure Ppri and the secondary pressure Psec are controlled by a shift control hydraulic circuit 11, together with hydraulic pressures supplied to the start clutch 7b that is engaged when a forward travel range is selected and to the reverse brake 7c that is engaged when a reverse travel range is selected. The shift control hydraulic circuit 11 performs the control in response to a signal from a transmission controller 12.

A signal from an input rotation speed sensor 13 that detects an actual input rotation speed Nin of the CVT 1, a signal from a vehicle speed sensor 14 that detects an output rotation speed of the CVT 1, that is, a vehicle speed VSP, a signal from a primary pressure sensor 15p that detects the primary pressure Ppri, a signal from a secondary pressure sensor 15s that detects the secondary pressure Psec, a signal from an accelerator opening sensor 16 that detects an accelerator opening APO, a selected range signal from an inhibitor switch 17 that detects a select lever position, a signal from a brake switch 18 that detects whether a brake pedal is depressed or not, and a signal regarding an operation state of the engine 5 from an engine controller 19 that controls the engine 5 (engine rotation speed Ne, engine torque, fuel injection time, cooling water temperature TMPe and the like) are inputted to the transmission controller 12.

Figure 2:
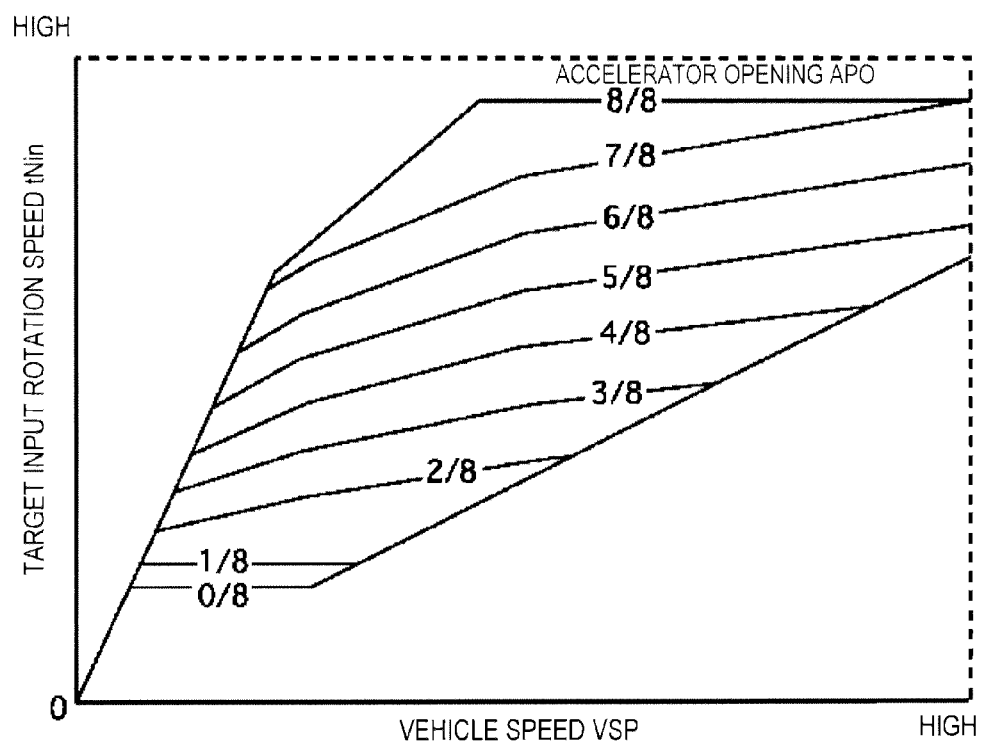
FIG. 2 is a shift map of the continuously variable transmission.

The transmission controller 12 refers to a shift map as illustrated in FIG. 2, sets a target input rotation speed tNin corresponding to the vehicle speed VSP and the accelerator opening APO, and controls the primary pressure Ppri and the secondary pressure Psec so that an actual input rotation speed Nin follows the target input rotation speed tNin, and a pulley thrusting force required for transmitting input torque of the CVT 1, determined by the engine torque and a torque converter torque ratio, can be obtained.

At this time, a lower limit value that is obtained by a computation using the following expression (hereinafter referred to as a "theoretical lower limit value") is set for the primary pressure Ppri and the secondary pressure Psec, and the primary pressure Ppri and the secondary pressure Psec are usually controlled so as not to fall below the theoretical lower limit value.

Theoretical lower limit value=$(T \cos \theta)/(2\mu R)$

T: Transmission torque
θ: Sheave angle of the pulley
μ: Coefficient of friction between the belt and the pulley
R: Contact radius between the belt and the pulley When either one of the pressures is controlled to the theoretical lower limit value, the other pressure is increased so that a differential thrust required for the shift is secured between the primary pulley 2 and the secondary pulley 3.

At the time of the shift returning to low when the vehicle is decelerated and the CVT 1 performs downshift toward the lowest along the APO=0/8 line in FIG. 2, such as when an accelerator is released and the brake pedal is depressed, or when the vehicle climbs a hill, and at the time of immediately before stopping or under normal shift condition when the speed ratio does not change (lowest), it is possible to reduce the primary pressure Ppri to be lower than the theoretical lower limit value, except for the case immediately before stopping or under the normal shift condition when the speed ratio does not change, in order to suppress a belt slip that may be caused by reducing the primary pressure Ppri to be lower than the primary pressure theoretical lower limit value.

Therefore, the transmission controller 12 performs the following hydraulic pressure reduction control during the shift returning to low, so that the primary pressure Ppri is reduced to be lower than the theoretical lower limit value. This makes it possible to improve a property of returning to low of the vehicle on which the CVT 1 is mounted, and to further improve fuel efficiency by downsizing an oil pump.

Figure 3:
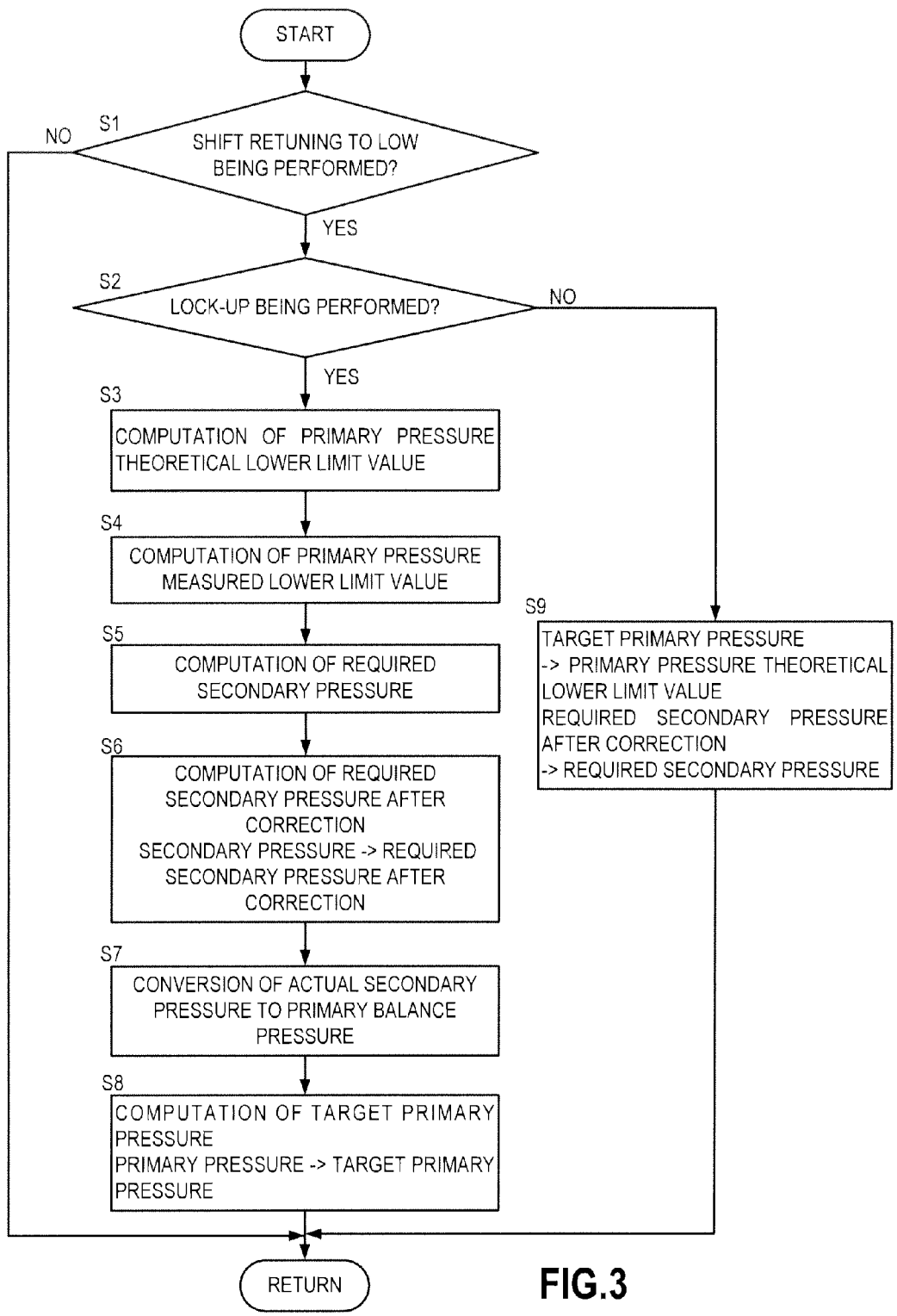
FIG. 3 is a flowchart illustrating the details of hydraulic pressure reduction control during a shift returning to low.
Figure 5:
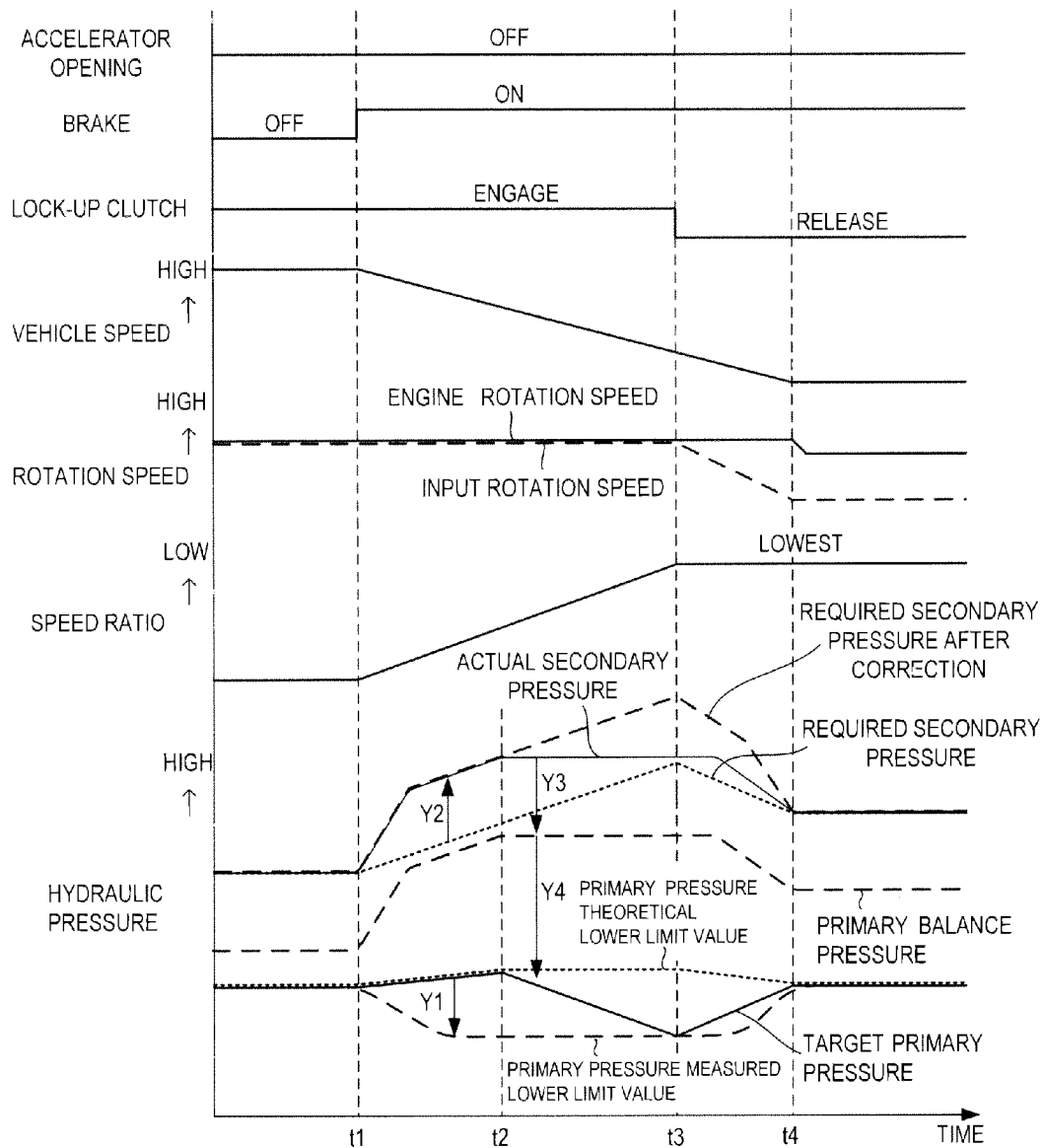
FIG. 5 is a time chart illustrating the state where the hydraulic pressure reduction control is performed during the shift returning to low.
Figure 6:
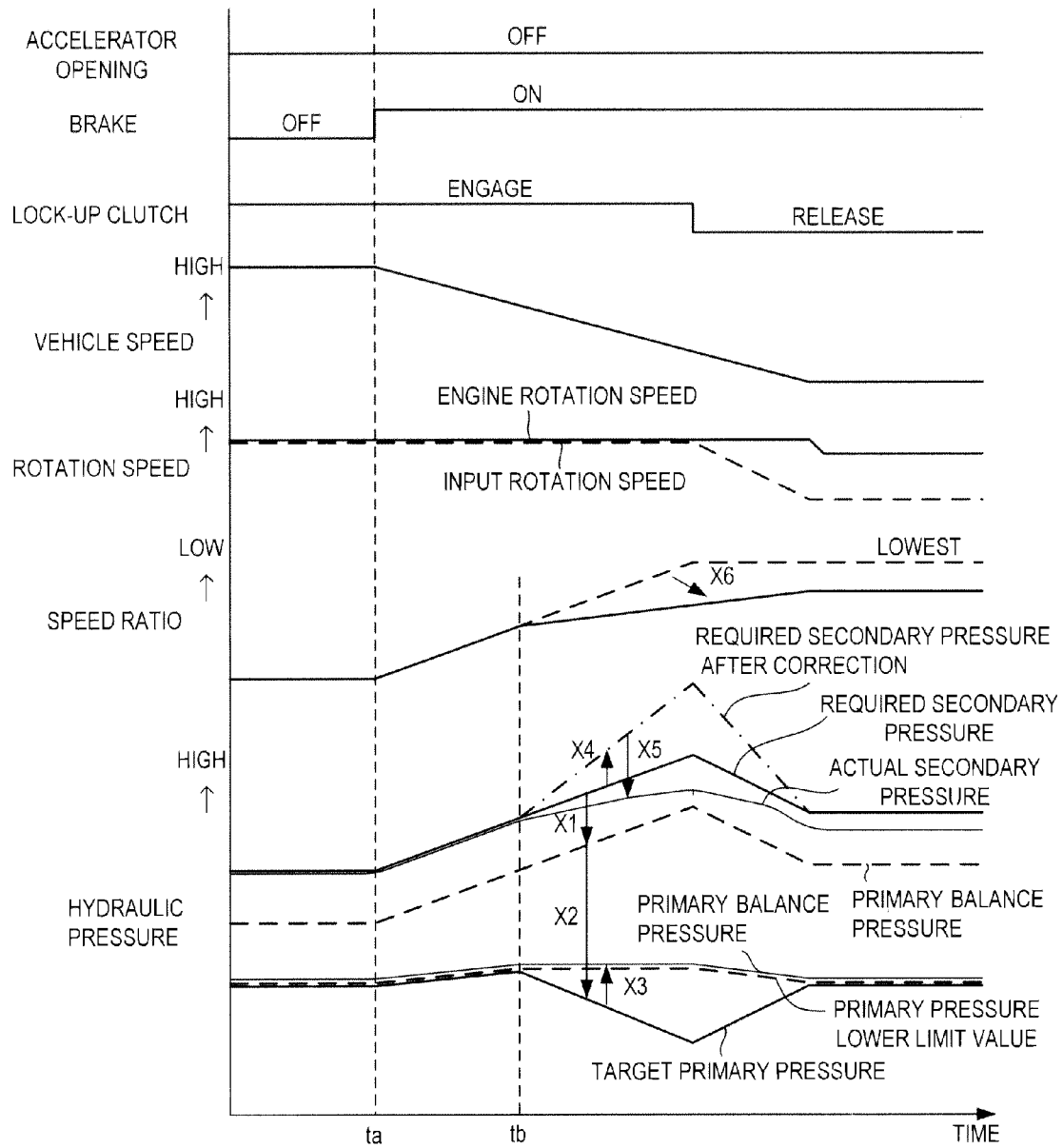
FIG. 6 is a time chart of a comparative example.

FIG. 3 is a flowchart illustrating the details of the hydraulic pressure reduction control during the shift returning to low that is performed by the transmission controller 12. The details, operations and effects of this control will be explained with reference to FIG. 3. In the explanation, a time chart illustrated in FIG. 5 will be referred to as appropriate. The time chart in FIG. 5 illustrates the state when the hydraulic pressure reduction control is performed during the shift returning to low.

First, in S1, the transmission controller 12 determines whether the shift returning to low is being performed or not. When the accelerator opening is zero and the brake pedal is depressed, or when the accelerator opening is zero and a deceleration of the vehicle is higher than a predetermined value (at the time of hill-climbing), the transmission controller 12 determines that the shift returning to low is being performed, and the processing proceeds to S2. Otherwise, the processing is ended.

In S2, the transmission controller 12 determines whether lock-up is being performed or not. As the lock-up clutch 6d is engaged when the vehicle speed VSP is faster than a predetermined lock-up start vehicle speed, and is released when the vehicle speed VSP is slower than a predetermined lock-up release vehicle speed (<lock-up start vehicle speed), the determination whether the lock-up is being performed or not can be made based on the vehicle speed VSP.

When it is determined that the lock-up is being performed, the processing proceeds to S3 and subsequent processing so as to reduce the primary pressure Ppri to be lower than the primary pressure theoretical lower limit value. When it is determined that the lock-up is not being performed, the processing proceeds to S9 so as to return the primary pressure Ppri, reduced to be lower than the primary pressure theoretical lower limit value in the processing in and after S3, to the primary pressure theoretical lower limit value.

In FIG. 5, the brake pedal is depressed and the shift returning to low is started at a time t1.

In S3, the transmission controller 12 performs a computation of the primary pressure theoretical lower limit value. The computation of the primary pressure theoretical lower limit value can be made by the transmission torque (=the torque of the engine 5 that is computed by referring to the engine torque map, based on the engine rotation speed Ne and the accelerator opening APO), the sheave angle (fixed value) of the primary pulley 2, the coefficient of friction (fixed value) between the belt 4 and the primary pulley 2, and the contact radius (value decided according to the speed ratio) between the belt 4 and the primary pulley 2, as described above.

In S4, the transmission controller 12 performs a computation of a primary pressure measured lower limit value. The primary pressure measured lower limit value is the primary pressure Ppri at which the belt 4 begins to slip actually, and is computed by referring to a map that is obtained by experiments in advance based on the deceleration and the speed ratio of the vehicle. The primary pressure measured lower limit value is set to have a smaller value as the deceleration of the vehicle becomes higher, and as the speed ratio becomes lower.

Figure 4:
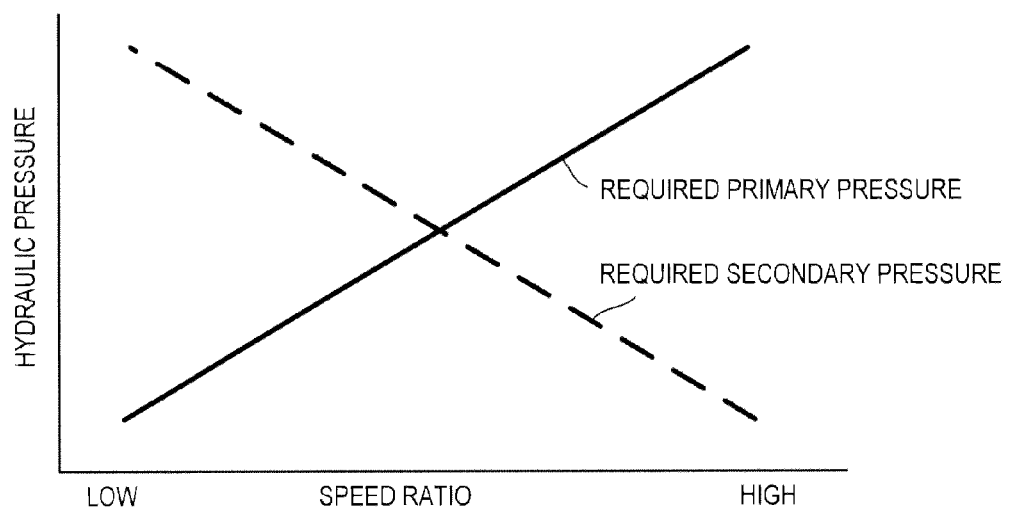
FIG. 4 is a table for computing a required secondary pressure.

In S5, the transmission controller 12 performs a computation of the secondary pressure Psec that is required for maintaining the speed ratio at that time, by referring to a table illustrated in FIG. 4. Incidentally, the required primary pressure, although illustrated in FIG. 4, is not used in the hydraulic pressure reduction control during the shift returning to low.

In S6, the transmission controller 12 adds a difference between the primary pressure theoretical lower limit value and the primary pressure measured lower limit value (Y1 in FIG. 5) to the required secondary pressure (Y2 in FIG. 5), and performs a computation of the required secondary pressure after correction. Then, the transmission controller 12 controls the secondary pressure Psec so that the secondary pressure Psec becomes the required secondary pressure after correction. Specifically, it controls a solenoid valve that regulates the secondary pressure Psec.

In S7, the transmission controller 12 detects the actual secondary pressure Psec, obtained as a result of controlling the secondary pressure Psec in S6, by the secondary pressure sensor 15s, and makes a conversion into a primary balance pressure based on this and a pressure receiving area ratio between the primary pulley 2 and the secondary pulley 3 (Y3 in FIG. 5).

In S8, the transmission controller 12 performs a computation of a target primary pressure by subtracting the differential thrust (the value obtained by dividing the required differential thrust by the pressure receiving area of the primary pulley 2) that is required for the downshift from the primary balance pressure (Y4 in FIG. 5). The target primary pressure becomes lower than the primary pressure theoretical lower limit value, but is higher than the primary pressure measured lower limit value, and hence it is not restricted by the primary pressure measured lower limit value. The transmission controller 12 controls the primary pressure Ppri so that the primary pressure Ppri becomes the target primary pressure. Specifically, it controls a solenoid valve that regulates the primary pressure Ppri.

In FIG. 5, a shortfall in an oil quantity balance is not actually caused from the time t1 to a time t2, and therefore, the actual secondary pressure is increased to the required secondary pressure after correction. Although it is possible to reduce the target primary pressure to the primary pressure measured lower limit value by changing the primary pressure theoretical lower limit value to the primary pressure measured lower limit value, the actual secondary pressure is increased until the shortfall in the oil quantity balance is actually caused and the primary pressure Ppri for obtaining the required differential thrust is computed from the actual secondary pressure Psec, for the purpose of suppressing the occurrence of the belt slip that may be caused by reducing the primary pressure.

After the time t2, the shortfall in the oil quantity balance is actually caused and the actual secondary pressure Psec is not increased to the required secondary pressure after correction. However, the target primary pressure that is obtained by subtracting the required differential thrust from the actual secondary pressure Psec is higher than the primary pressure measured lower limit value, and hence, the primary pressure Ppri can be reduced to the target primary pressure.

Namely, according to the control of S3 to S8, the lower limit value of the primary pressure is reduced so that the secondary pressure during the shift returning to low can be reduced relatively (or the differential thrust required for the shift can be obtained even though the sufficient secondary pressure is not secured), which makes it possible to downsize the oil pump and to improve the fuel efficiency.

Further, according to the control of S3 to S8, the target primary pressure is calculated from the actual secondary pressure Psec. Thus, in a region where the actual secondary pressure Psec can be increased as high as possible, the required differential thrust is secured without reducing the primary pressure. Even when the shortfall in the oil quantity balance is actually caused and the actual secondary pressure Psec is not increased to the required secondary pressure after correction (from the time t2 to a time t3 in FIG. 5), the required differential thrust can be secured by reducing the primary pressure to the lower limit value, so that the speed ratio of the CVT 1 can be immediately returned to the lowest.

Meanwhile, when it is determined in S2 as the case immediately before stopping or under the normal shift condition when the speed ratio does not change, the processing proceeds to S9, where the transmission controller 12 brings the target primary pressure closer to the primary pressure theoretical lower limit value by using a predetermined ramp gradient, and brings the required secondary pressure after correction closer to the required secondary pressure by using the predetermined ramp gradient, so as to control these to be the primary pressure theoretical lower limit value and the required secondary pressure, respectively.

Thereby, during shift transition when the speed ratio changes, relative slippage between the belt and the pulley is suppressed by the influence of a dynamic friction coefficient between the belt and the pulley, even when the primary pressure lower limit value is reduced. However, in the case immediately before stopping or under the normal shift condition when the speed ratio does not change actually (lowest), the relative slippage between the pulley and the belt may be caused when the coefficient of friction between the belt and the pulley shifts from the dynamic friction coefficient to a static friction coefficient. Therefore, it is possible to prevent the slippage of the belt 4 that may be caused by reducing the primary pressure lower limit value to be lower than the theoretical value in this region, and to improve the property of returning to low. In FIG. 5, this corresponds to the time t3 to a time t4.

The embodiment of the present invention has been explained thus far, but the above-described embodiment is only one of the application examples of the present invention, and is not intended to limit the technical scope of the present invention to the concrete structure of the above-described embodiment.

The present application claims priority to Japanese Patent Application No. 2012-74925 filed in the Japan Patent Office on Mar. 28, 2012. The contents of this application are incorporated herein by reference in their entirety.

The invention claimed is:

1. A continuously variable transmission that includes a primary pulley, a secondary pulley, and a belt wound therebetween, and that decides a pulley thrusting force by a primary pressure supplied to the primary pulley and a secondary pressure supplied to the secondary pulley, the continuously variable transmission comprising:
a unit for determining a shift returning to low configured to determine whether the shift returning to low, changing a speed ratio of the continuously variable transmission to lowest when a vehicle decelerates, is being performed or not; and
the unit for computing a measured lower limit value configured to calculate a primary pressure measured lower limit value at which the belt begins to slip actually, based on a deceleration of the vehicle and the speed ratio of the continuously variable transmission,
wherein a lower limit value of a target value of the primary pressure during the shift returning to low is set as the primary pressure measured lower limit value.

2. The continuously variable transmission according to claim 1,
wherein, when it is determined that the shift returning to low is being performed, a required secondary pressure that is required for maintaining the speed ratio of the continuously variable transmission is computed,
a difference between a primary pressure theoretical lower limit value and the primary pressure measured lower limit value is computed,
a required secondary pressure after correction is computed by adding the difference to the required secondary pressure,
an actual secondary pressure is controlled so that the actual secondary pressure becomes the required secondary pressure after correction, and
the target value of the primary pressure is computed from the actual secondary pressure.

3. The continuously variable transmission according to claim 2,
wherein, after a vehicle speed is reduced and a state where the vehicle is immediately before stopping or a state where the speed ratio is lowest is detected, the primary pressure is controlled to be the primary pressure theoretical lower limit value.

4. A hydraulic pressure control method of a continuously variable transmission that includes a primary pulley, a secondary pulley, and a belt wound therebetween, and that decides a pulley thrusting force by a primary pressure supplied to the primary pulley and a secondary pressure supplied to the secondary pulley, the hydraulic pressure control method comprising:
determining whether a shift returning to low, changing a speed ratio of the continuously variable transmission to lowest when a vehicle decelerates, is being performed or not;
calculating a primary pressure measured lower limit value at which the belt begins to slip actually, based on a deceleration of the vehicle and the speed ratio of the continuously variable transmission; and
setting a lower limit value of a target value of the primary pressure during the shift returning to low as the primary pressure measured lower limit value.

5. The hydraulic pressure control method according to claim 4, further comprising:
computing, when it is determined that the shift returning to low is being performed, a required secondary pressure that is required for maintaining the speed ratio of the continuously variable transmission;
computing a difference between a primary pressure theoretical lower limit value and the primary pressure measured lower limit value;
computing a required secondary pressure after correction by adding the difference to the required secondary pressure;
controlling an actual secondary pressure so that the actual secondary pressure becomes the required secondary pressure after correction; and
computing the target value of the primary pressure from the actual secondary pressure.

6. The hydraulic pressure control method according to claim 5, further comprising:
controlling the primary pressure to be the primary pressure theoretical lower limit value, after a vehicle speed is reduced and a state where the vehicle is immediately before stopping or a state where the speed ratio is lowest is detected.

7. A continuously variable transmission that includes a primary pulley, a secondary pulley, and a belt wound therebetween, and that decides a pulley thrusting force by a primary pressure supplied to the primary pulley and a secondary pressure supplied to the secondary pulley, the continuously variable transmission comprising:
means for determining a shift returning to low that determines whether the shift returning to low, changing a speed ratio of the continuously variable transmission to lowest when a vehicle decelerates, is being performed or not; and means for computing a measured lower limit value that calculates a primary pressure measured lower limit value at which the belt begins to slip actually, based on a deceleration of the vehicle and the speed ratio of the continuously variable transmission, wherein a lower limit value of a target value of the primary pressure during the shift returning to low is set as the primary pressure measured lower limit value.

8. The continuously variable transmission according to claim 7, wherein, when it is determined that the shift returning to low is being performed, a required secondary pressure that is required for maintaining the speed ratio of the continuously variable transmission is computed, a difference between a primary pressure theoretical lower limit value and the primary pressure measured lower limit value is computed, a required secondary pressure after correction is computed by adding the difference to the required secondary pressure, an actual secondary pressure is controlled so that the actual secondary pressure becomes the required secondary pressure after correction, and the target value of the primary pressure is computed from the actual secondary pressure.

9. The continuously variable transmission according to claim 8, wherein, after a vehicle speed is reduced and a state where the vehicle is immediately before stopping or a state where the speed ratio is lowest is detected, the primary pressure is controlled to be the primary pressure theoretical lower limit value.

* * * * *